United States Patent
Jang et al.

(10) Patent No.: US 7,542,438 B2
(45) Date of Patent: Jun. 2, 2009

(54) RELIABLE MULTICAST DATA RETRANSMISSION METHOD BY GROUPING WIRELESS TERMINALS IN WIRELESS COMMUNICATION MEDIUM AND APPARATUS FOR THE SAME

(75) Inventors: Kyung-Hun Jang, Suwon (KR); Hyo-sun Hwang, Suwon (KR); Jong-ae Park, Yongin (KR)

(73) Assignee: Samsung Electronics Co., Ltd. (KR)

( * ) Notice: Subject to any disclaimer, the term of this patent is extended or adjusted under 35 U.S.C. 154(b) by 1004 days.

(21) Appl. No.: 10/612,141

(22) Filed: Jul. 2, 2003

(65) Prior Publication Data
US 2004/0071128 A1 Apr. 15, 2004

(30) Foreign Application Priority Data
Oct. 15, 2002 (KR) .............. 10-2002-0062883

(51) Int. Cl.
H04H 20/71 (2008.01)
H04L 12/28 (2006.01)

(52) U.S. Cl. ................. 370/312; 370/389

(58) Field of Classification Search ........ 370/312, 370/390, 349, 389, 394, 432, 471
See application file for complete search history.

(56) References Cited

U.S. PATENT DOCUMENTS

| | | | | |
|---|---|---|---|---|
| 5,490,139 | A * | 2/1996 | Baker et al. ............. | 370/312 |
| 5,748,736 | A * | 5/1998 | Mittra ................... | 713/163 |
| 6,122,483 | A * | 9/2000 | Lo et al. ............... | 455/12.1 |
| 6,594,272 | B1 * | 7/2003 | Ketcham et al. ......... | 370/428 |
| 6,970,476 | B1 * | 11/2005 | Jonsson et al. .......... | 370/401 |
| 7,065,066 | B2 * | 6/2006 | Mizutani et al. ......... | 370/338 |
| 7,095,739 | B2 * | 8/2006 | Mamillapalli et al. .... | 370/390 |
| 2002/0021684 | A1 * | 2/2002 | Toshimitsu et al. ...... | 370/337 |
| 2003/0012195 | A1 * | 1/2003 | Ohkubo et al. .......... | 370/390 |

(Continued)

FOREIGN PATENT DOCUMENTS

EP 0 698 975 2/1996

(Continued)

OTHER PUBLICATIONS

Sanjoy Paul et al., Reliable Multicast Transport Protocol (RMTP), IEEE Journal on Selected Areas in Communications, Apr. 1997., 407-420.*

(Continued)

Primary Examiner—Kevin C Harper
Assistant Examiner—Mon Cheri S Davenport
(74) Attorney, Agent, or Firm—McNeely Bodendorf LLP (57) ABSTRACT

A reliable multicast data retransmission method by grouping wireless terminals in a wireless communication environment and performing multicast data retransmission for a particular group of wireless terminals that needs multicast data retransmission, thereby providing reliable multicast data retransmission and improving the efficiency of a network. The multicast data retransmission method includes grouping wireless terminals based on distances between an access point and the wireless terminals and the amplitudes of signals output from the wireless terminals, selecting a repeater, which is to retransmit multicast packets, from each group and arranging the order in which repeaters retransmit multicast packets, creating a multicast packet train header indicating characteristics of each of the multicast packets, multicasting the created multicast packet train header. The multicast packets are retransmitted in the arranged order.

16 Claims, 10 Drawing Sheets

U.S. PATENT DOCUMENTS

2004/0071128 A1* 4/2004 Jang et al. .................... 370/349
2005/0025083 A1* 2/2005 Murai et al. ................. 370/312
2005/0259643 A1* 11/2005 Chuah et al. ................ 370/389

FOREIGN PATENT DOCUMENTS

| EP | 1 146 683 | 10/2001 |
| EP | 1146683 A2 * | 10/2001 |
| JP | 2002-141856 | 5/2002 |

OTHER PUBLICATIONS

Whetten, Brian, An overview of Reliable Multicast Protocol II, IEEE Network, Jan./Feb. 2000, 37-47.*

Sanjoy Paul et al., "Reliable Multicast Trsnsport Protocol (RMTP)", IEEE Journal on Selected Areas in Communications, Apr. 1997.

Luigi Rizzo et al., "RMDP: An FEC-Based Reliable Multicast Protocol for Wireless Environments", Mobile Computing and Communications Review, Apr. 1998.

* cited by examiner

RELIABLE MULTICAST DATA RETRANSMISSION METHOD BY GROUPING WIRELESS TERMINALS IN WIRELESS COMMUNICATION MEDIUM AND APPARATUS FOR THE SAME

CROSS REFERENCE TO RELATED APPLICATION

This application claims the priority of Korean Patent Application No. 2002-62883, filed on Oct. 15, 2002 in the Korean Intellectual Property Office, the disclosure of which is incorporated herein by reference in its entirety.

BACKGROUND OF THE INVENTION

1. Field of the Invention

The present invention relates to reducing packet loss during multicast data transmission in a wireless communication environment, and more particularly, to a reliable multicast data retransmission method by grouping wireless terminals in a wireless communication environment and performing multicast data retransmission for a particular group of wireless terminals which needs multicast data retransmission, thereby providing reliable multicast data retransmission and improving the efficiency of a network.

2. Description of the Related Art

To allow for data transmission over Internet, unicast, broadcast, multicast, and anycast transmissions have been provided.

Figure 1:
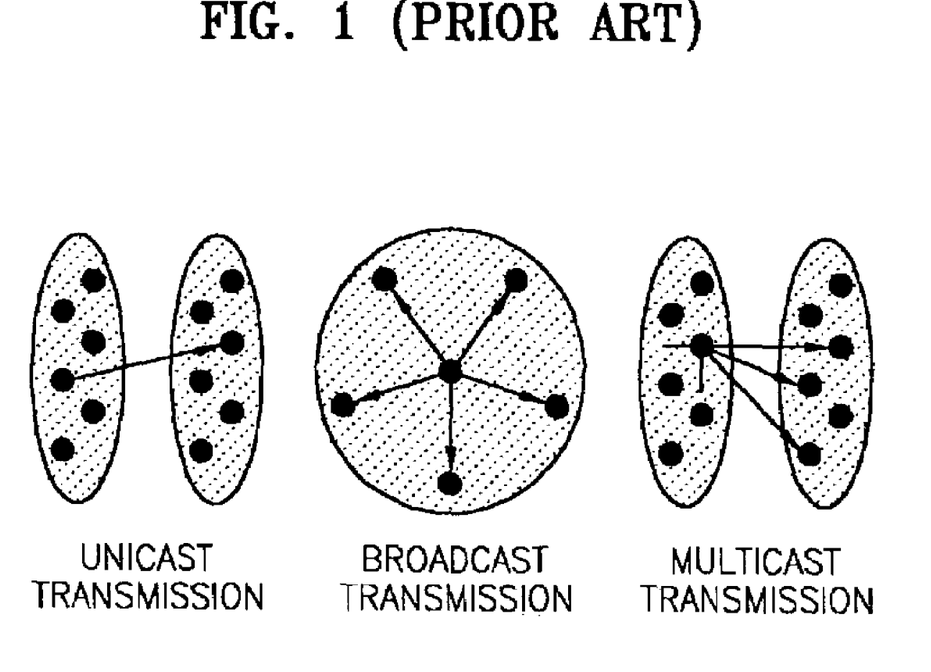
FIG. 1 is a diagram for describing unicast, broadcast, and multicast transmissions.

FIG. 1 is a view for describing unicast, broadcast, and multicast transmissions.

Unicast transmission is a one-to-one type of data transmission that permits one sender to transmit data to one receiver. Consequently, when the sender desires to transmit data to multiple receivers, the unicast transmission overloads sender resources and exhibits inefficient network bandwidth usage. Moreover, the unicast transmission is not available when data to be transmitted to the multiple receivers is bulky such as multimedia data.

Broadcast transmission is a one-to-many type of data transmission that permits a sender to transmit data to all of the receivers connected to a network. Once the sender transmits data to one receiver, the rest of the receivers receive duplicates of the data. Consequently, the broadcast transmission can improve the efficiency of the network and reduce network congestion. However, unnecessary traffic is created because data is transmitted even to a receiver that does not desire to receive the data.

Anycast transmission has recently been introduced, in which data is transmitted to the most appropriate server having an anycast address. The anycast address is used to define each group of servers that provide the same service to a user. The user with need of data selects the most appropriate server capable of providing the best service from among a group of servers having the same anycast address and is provided with the data.

In multicast transmission, the sender transmits data only to a multicast group including receivers that desire to receive the data. Since the multicast transmission supports a one-to-many type of data transmission and a many-to-many type of data transmission, it eliminates the disadvantages of the unicast transmission and broadcast transmission. The sender can improve the efficiency of the network and reduce network congestion because the sender is required to transmit only a single data packet. Also, the receiver can prevent the creation of unnecessary traffic because the receiver is required to provide duplicates of the-data packet only to the multicast group.

Multicast transmission is the most efficient method for effectively transmitting data over an Internet broadcast, a video on demand (VOD), or an Internet videoconference.

In particular, multicast transmission exhibits a more efficient performance in a wireless communication environment having limited network resources such as bandwidth and power. However, when a multicasting technique for use with a fixed network such as a cable network is used in a wireless communication environment, a separate multicast tree must be constructed for each network source, which increases control traffic and causes frequent packet loss.

Accordingly, a method that maintains the advantage of multicast transmission and is adequate for a wireless communication environment is needed for an efficient communication system.

Retransmission is a key mechanism of reliable multicast data transmission to recover packet loss. By using acknowledgement (ACK) frame transmission, the sender can determine whether the receiver accurately receives data and retransmit, if necessary, the data based on the determined result.

However, when the sender receives acknowledgement (ACK) messages from multiple receivers, a delay in receiving the ACK messages from all of the receivers is longer than the amount of time necessary for data transmission, which disrupts efficient usage of network resources. In an attempt to solve such a problem, negative acknowledgement (NACK) frame transmission instead of ACK frame transmission is used for retransmission. However, such an attempt has not been useful for the wireless communication environment having a high packet error probability.

Instead of automatic repeat request (ARQ) using ACK or NACK frame transmission, data may be transmitted after being replicated. Since the sender does not need to wait for additional information from the receiver, it is possible to maintain a constant efficiency of a channel irrespective of the number of receivers and reduce the packet loss probability due to repeated transmission.

However, since a status of the channel is dynamically changed over time in the wireless communication environment, a repeated transmission in a fixed way cannot help the recovery of packet loss. In other words, since the position and status of a channel of each receiver are different from one another, the receiver with a superior channel can receive all data packets from the sender all the time, and on the other hand, the receiver with an inferior channel has the high packet loss probability all the time.

Therefore, the following aspects have to be considered to achieve efficient data transmission in the wireless communication environment. First, retransmission has to be performed in consideration of the status of the channel of each receiver. Second, retransmission must not be performed on a terminal with a channel inferior to that of the terminal with the worst data reception status from an access point (AP). This is because such retransmission can improve the reliability of data transmission, but may result in inefficient usage of network resources. Third, retransmission has to allow for reliable multicast data transmission and efficient usage of network resources.

SUMMARY OF THE INVENTION

The present invention provides a reliable retransmission mechanism by grouping wireless terminals and performing data retransmission for a particular group of wireless terminals, thereby recovering packet loss occurring during multicast data transmission in a wireless communication environment.

According to one aspect of the present invention, there is provided a multicast data retransmission method comprising the steps of (a) grouping wireless terminals based on distances between an access point and the wireless terminals and the amplitudes of signals output from the wireless terminals, (b) selecting a repeater, which is to retransmit multicast packets, from each group and arranging the order in which repeaters retransmit multicast packets, (c) creating a multicast packet train header indicating characteristics of each of the multicast packets, (d) multicasting the created multicast packet train header, and (e) retransmitting the multicast packets in the order arranged in step (b).

According to another aspect of the present invention, there is provided a multicast data retransmission method used in a system that retransmits multicast packets by using a wireless terminal and an access point, the multicast data retransmission method comprising the steps of (a) receiving from the access point information on a group which the wireless terminal belongs to, (b) if the wireless terminal is selected as a repeater that is to retransmit the multicast packets, receiving information about the order in which repeaters retransmit the multicast packets, from the access point, and (c) receiving a retransmission command from the access point and retransmitting the multicast packets to other wireless terminals.

According to yet another aspect of the present invention, there is provided a multicast data retransmission method comprising the steps of (a) grouping wireless terminals based on distances between an access point and the wireless terminals and the amplitudes of signals output from the wireless terminals, and (b) selecting a repeater, which is to retransmit multicast packets, from each group and retransmitting the multicast packets.

According to yet another aspect of the present invention, there is provided an apparatus for multicast data retransmission comprising a grouping unit which groups wireless terminals based on the distances between the wireless terminals and the amplitudes of signals output from the wireless terminals, a repeater selecting and retransmission order arranging unit which selects the repeater, which is to retransmit the multicast packets, from each group and arranges the order in which repeaters retransmit the multicast packets, a multicast packet train header creating unit which creates a multicast packet train header before the multicast packets are multicasted, a multicast packet train header transmitting unit which transmits the created multicast packet train header to all wireless terminals, and a retransmitting unit which retransmits the multicast packets in the order arranged by the repeater selecting and retransmission order arranging unit, after the multicast packet train header transmitting unit multicasts the multicast packet train header.

According to yet another aspect of the present invention, there is provided a structure of a multicast packet train header used in multicast data transmission, the structure of multicast packet train header comprising multicast train ID information which is used to identify a multicast packet train, information about the number of groups of wireless terminals, the wireless terminals being connected to a wireless network and receiving the multicast packets, information about the number of multicast packet in each group which indicates the number of multicast packet in each group, the multicast packet being to be transmitted after the multicast packet train header is multicasted, and forward error correction information which is used to correct an error of the multicast packet train header.

According to yet another aspect of the present invention, there is provided a computer readable medium having embodied thereon a computer program for the multicast data retransmission method.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 2:
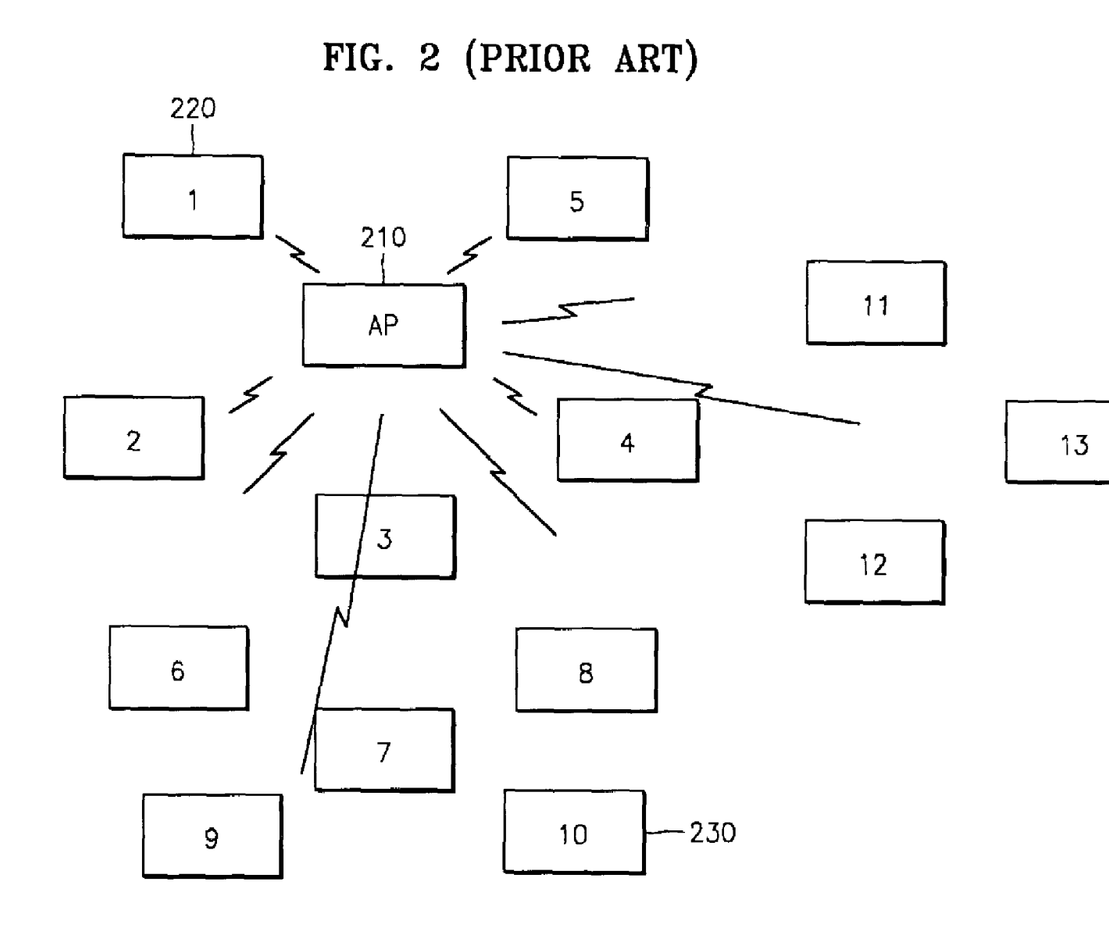
FIG. 2 is a diagram showing a general network including an access point (AP) and wireless terminals.

FIG. 2 is a diagram showing a general network including an access point (AP) 210 and wireless terminals.

The wireless terminals may be located near the AP 210 in the same manner as a wireless terminal "1" 220 or far away from the AP 210 in the same manner as a wireless terminal "10" 230.

The AP 210 groups the wireless terminals based on the distances between the wireless terminals and the AP 210 and the amplitudes of signals output from the wireless terminals prior to multicast data transmission, selects a repeater, which is to retransmit received multicast data, from each group, and determines the order in which selected repeaters retransmit the received multicast data. The AP 210 and each selected repeater retransmit received multicast data in the order determined by the AP 210. Such a procedure will be described with reference to FIG. 3, and a structure of a multicast packet train header, used when the AP 210 and each selected repeater transmits the multicast data, will be described with reference to FIG. 8.

Figure 3:
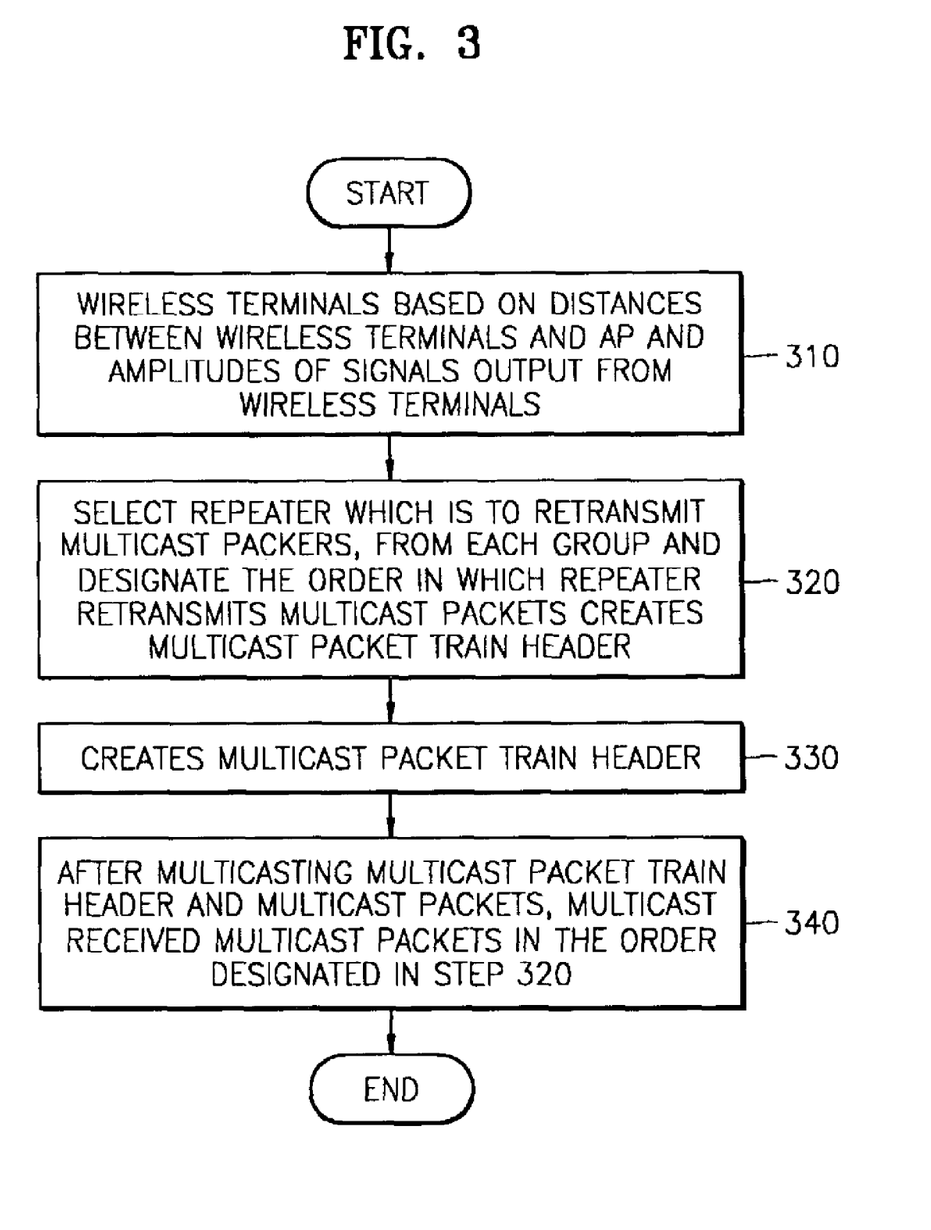
FIG. 3 is a flowchart for explaining a reliable multicast data retransmission method performed by grouped wireless terminals, according to an embodiment of the present invention.

FIG. 3 is a flowchart for explaining a reliable multicast data retransmission method performed by grouped wireless terminals, according to an embodiment of the present invention.

In step 310, an access point (AP) groups wireless terminals based on the distances between the wireless terminals and the AP and the amplitudes of signals output from the wireless terminals. In other words, a wireless terminal in a network is grouped with nearby wireless terminals. If the amplitudes of signals output from a group of wireless terminals are less than those of signals output from other groups of wireless terminals because the group includes wireless terminal with an inferior channel, the wireless terminal with the inferior channel is grouped with one of the other groups of wireless terminals.

Since the wireless terminals included in the same group are located adjacent to one another, the packet loss probability of communication therebetween is less than that of communication with wireless terminals included in other groups.

In step 320, the AP selects a repeater, which is to retransmit received multicast packets, from each group of wireless terminals and determines the order in which repeaters retransmit the received multicast packets. Since a wireless terminal with the best channel is selected as the repeater from each group, the packet loss probability of the repeater is the least among the wireless terminals in the same group. The AP arranges the order in which repeaters retransmit the received multicast packet so as to prevent collisions of multicast packets during repeaters' retransmission. Since the AP transmits the multicast packet at first, a group including the AP is a group 1.

In step 330, the AP creates a multicast packet train header (MTU) prior to multicast data transmission. The multicast packet train header (MTU) includes multicast train ID information, information about the number-of groups of wireless terminals, information about the number of multicast packets in each group, and forward error correction (FEC) information. The multicast train ID information is used to identify a multicast packet train. The information about the number of groups of wireless terminals indicates the number of groups of wireless terminals that are to receive multicast packets, being connected to a wireless network. The information about the number of multicast packets in each group indicates the number of multicast packets in each group which are to be transmitted after the multicast packet train header (MTU) is multicasted.

In step 340, after the AP multicasts the multicast packet train header (MTU) and the multicast packets, the repeater in each group multicasts the received multicast packets in the order arranged in step 320. Then, the wireless terminal that has already received the multicast packets without any error discards the multicast packets retransmitted from the repeater. On the contrary, the wireless terminal that has not accurately received the multicast packets receives the multicast packets retransmitted from the repeater.

Figure 4:
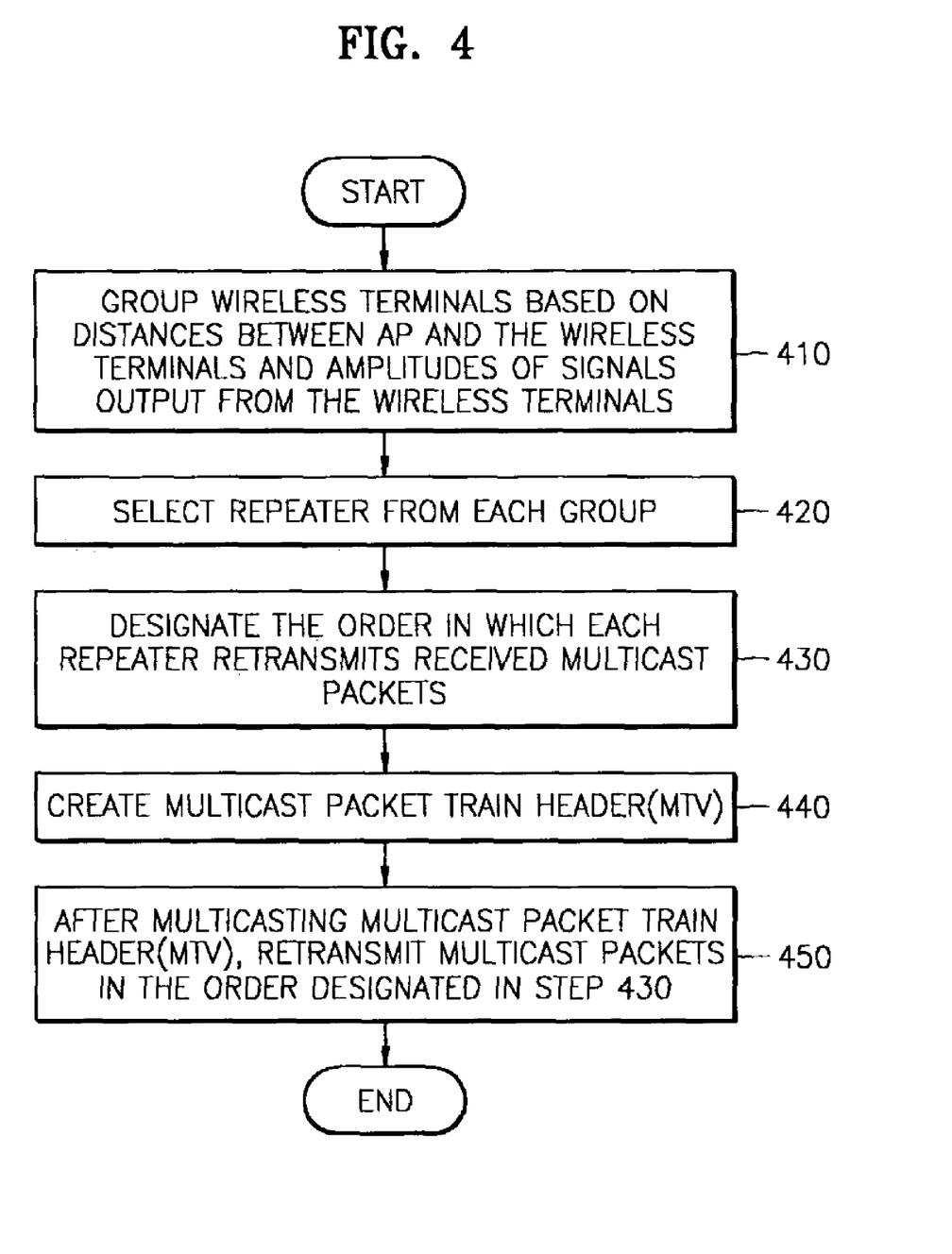
FIG. 4 is a flowchart for explaining a procedure of multicast data retransmission from the AP, according to an embodiment of the present invention.

FIG. 4 is a flowchart for explaining a procedure of multicast data retransmission from the AP, according to the present invention.

In step 410, the AP groups the wireless terminals based on the distances between the wireless terminals and the AP and the amplitudes of signals output from the wireless terminals. Such grouping has already been described with reference to FIG. 3.

In step 420, the AP selects a repeater, which is to retransmit the multicast packets, from each group. A wireless terminal with the best channel is selected as the repeater from each group. Since the AP can determine a status of a channel of a wireless terminal based on the amplitude of signal output from the wireless terminal, the AP selects the wireless terminal, which outputs the signal with the greatest amplitude, as the repeater.

In step 430, the AP arranges the order in which selected repeaters retransmit the multicast packet. Since a wireless terminal with the best channel is selected as the repeater from each group, the packet error probability of the repeater is the smallest among other wireless terminals in the same group. The order in which repeaters retransmit the multicast packets can be arranged at random.

In step 440, the AP creates the multicast packet train header (MTU). As described above, the multicast packet train header (MTU) includes the multicast train ID information, the information about the number of group of wireless terminals, the information about the number of multicast packets in each group, and the forward error correction (FEC) information.

In step 450, after multicasting the multicast packet train header (MTU), the AP retransmits the multicast packets.

Figure 5:
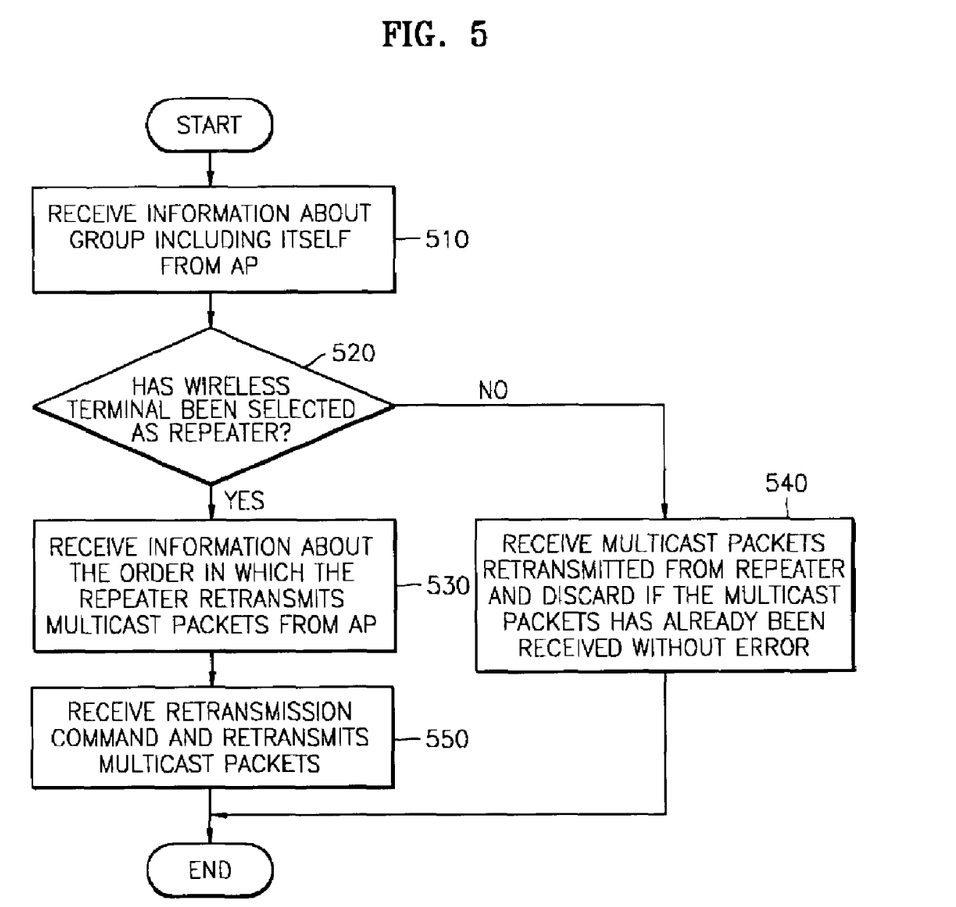
FIG. 5 is a flowchart for explaining a procedure-of multicast data retransmission from a wireless terminal, according to an embodiment of the present invention.

FIG. 5 is a flowchart for explaining a procedure of multicast data retransmission from the grouped wireless terminals, according to the present invention.

The wireless terminals are grouped by the AP. A wireless terminal selected as the repeater by the AP from a group retransmits the multicast packets and other wireless terminals in the same group receive the multicast packets retransmitted from the repeater.

In step 510, in a system that retransmits the multicast packets by using a wireless terminal and the AP, the wireless terminal receives information about a group including itself from the AP. In step 520, the wireless terminal determines whether it is selected as a repeater.

In step 530, if the wireless terminal has been selected as the repeater that is to retransmit multicast packets, the wireless terminal receives information about the order in which repeaters retransmit the multicast packet from the AP.

In step 540, if the wireless terminal has not been selected as the repeater, the wireless terminal receives multicast packets retransmitted from the repeater and discards the same if it has already received the multicast packets without a packet error.

In step 550, the wireless terminal receives a retransmission command from the AP, and the repeater receiving the retransmission command retransmits the multicast packets to other wireless terminals in the same group.

Figure 6:
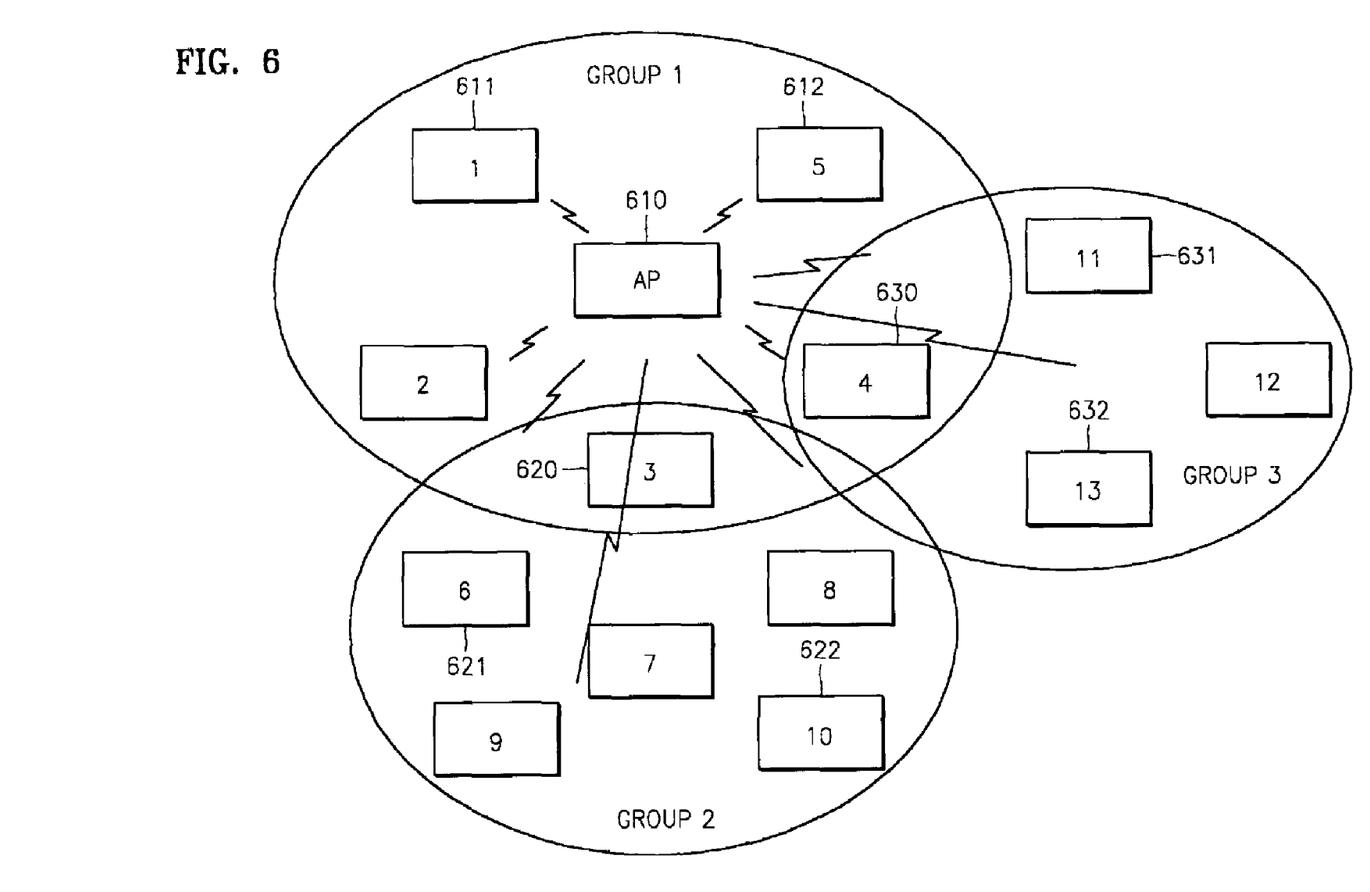
FIG. 6 is a diagram showing wireless terminals that are grouped based on distances between the wireless terminals and the AP and the amplitudes of signals output from the wireless terminals according to an embodiment of the present invention.

FIG. 6 is a diagram showing wireless terminals that are grouped based on distances between the wireless terminals and the AP and the amplitudes of signals output from the wireless terminals.

As shown in FIG. 6, a wireless terminal "1" 611 through a wireless terminal "5" 612 are grouped as a group 1 including an access node (AP) 610 in its center. A wireless terminal "3" 620 and a wireless terminal "6" 621 wireless terminal "10" 622 are grouped as a group 2. In the same way, a wireless terminal "4" 630 and a wireless terminal "11" 631 to wireless terminal "13" 632 are grouped as a group 3.

Since the wireless terminals included in the same group are located adjacent to one another, the packet loss probability during communication therebetween is smaller than that during communication with wireless terminals included in other groups.

Figure 7:
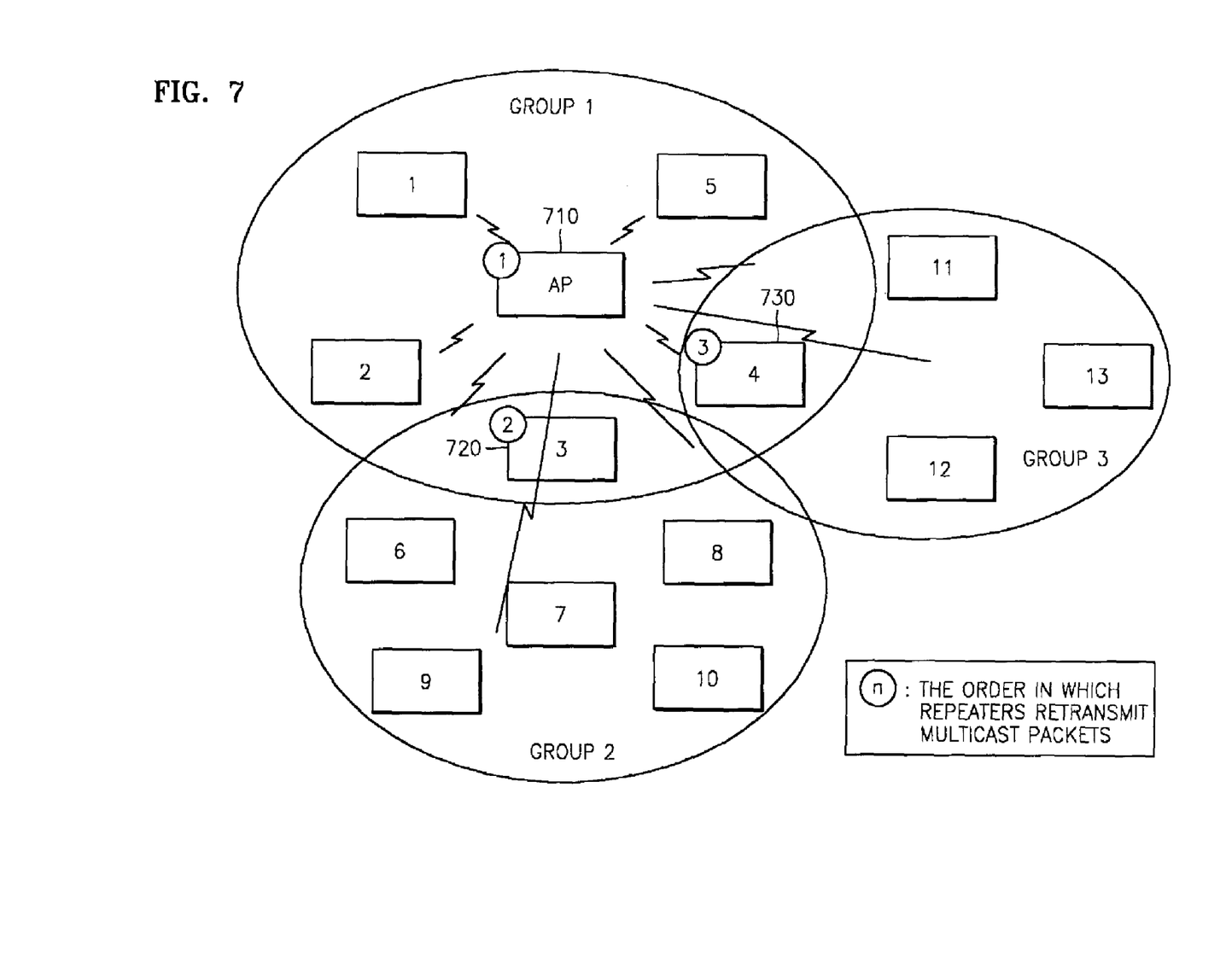
FIG. 7 is a diagram for describing a procedure for selecting a repeater, which is to retransmit multicast packets, from each group and arranging the order in which repeaters retransmit the multicast packets according to an embodiment of the present invention.

FIG. 7 is a diagram for describing a procedure for selecting a repeater, which is to retransmit multicast packets, from each group and arranging the order in which repeaters retransmit the multicast packet.

Since a wireless terminal with the best channel is selected as the repeater, the packet loss probability of the repeater is the smallest among the wireless terminals in the same group. The order in which the repeaters retransmit the multicast packets is arranged by the AP so as to prevent collisions of multicast packets during repeaters' retransmission.

As shown in FIG. 7, an access point (AP) 710 functions as a repeater of a group 1, a wireless terminal "3" 720 functions as a repeater of a group 2, and a wireless terminal "4" 730 functions as a repeater of a group 3. The order of the repeaters is according to the retransmission order of the multicast packet.

Figure 8:
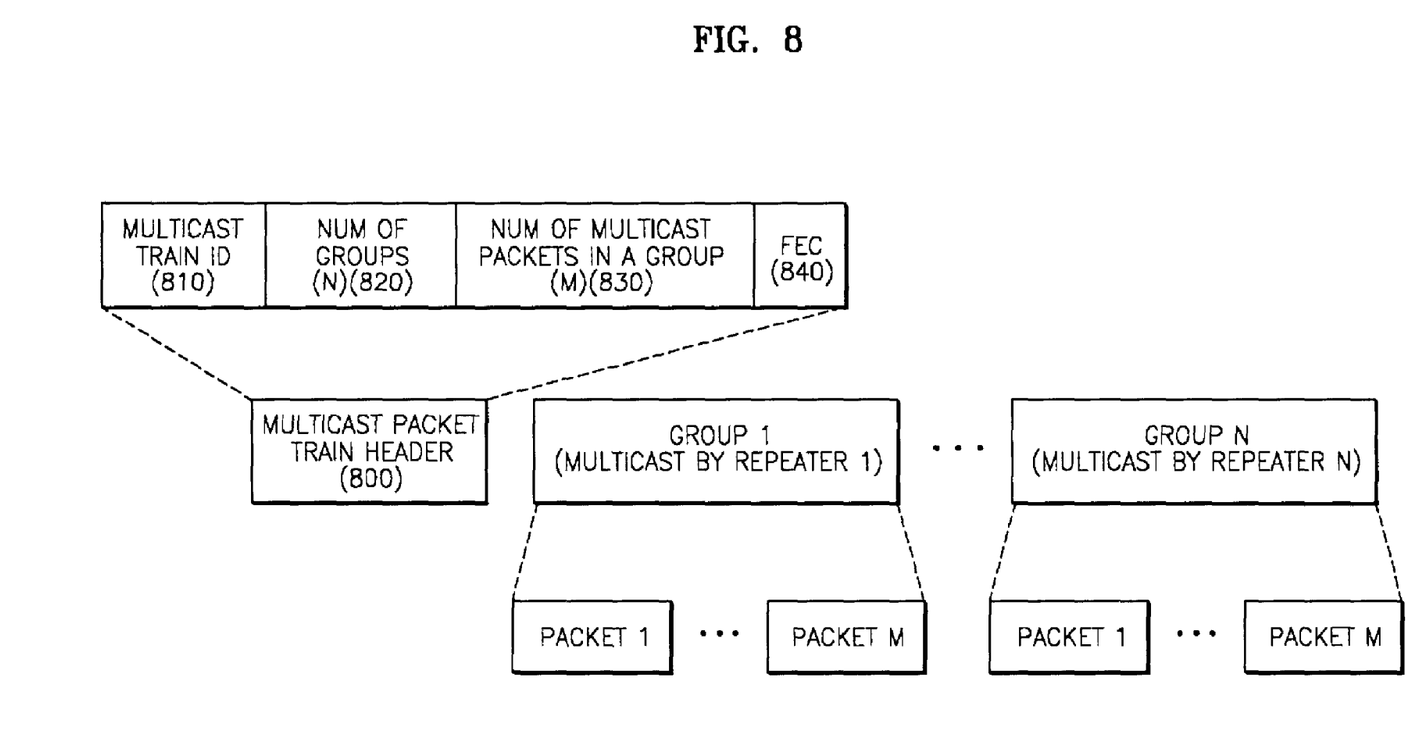
FIG. 8 is a diagram showing a structure of a multicast packet train header according to an embodiment of the present invention.

FIG. 8 is a diagram showing a structure of the multicast packet train header (MTU).

A multicast packet train header (MTU) 800 includes multicast train ID information 810, information about the number of group of wireless terminals 820, information about the number of multicast packet in each group 830, and forward error correction (FEC) information 840.

The multicast train ID information 810 is used to identify a multicast packet train that includes a plurality of multicast packets to be retransmitted.

The information about number of groups of wireless terminals 820 indicates the number of group of wireless terminals that are to receive the multicast packets, being connected to a wireless network.

The information about the number of multicast packets in each group 830 indicates the number of multicast packets that are to be transmitted after the multicast packet train header (MTU) is multicasted, that is, is the same as the number of multicast packets that are to be retransmitted by the repeater of each group.

The FEC 840 is used to correct a transmission error.

Figure 9:
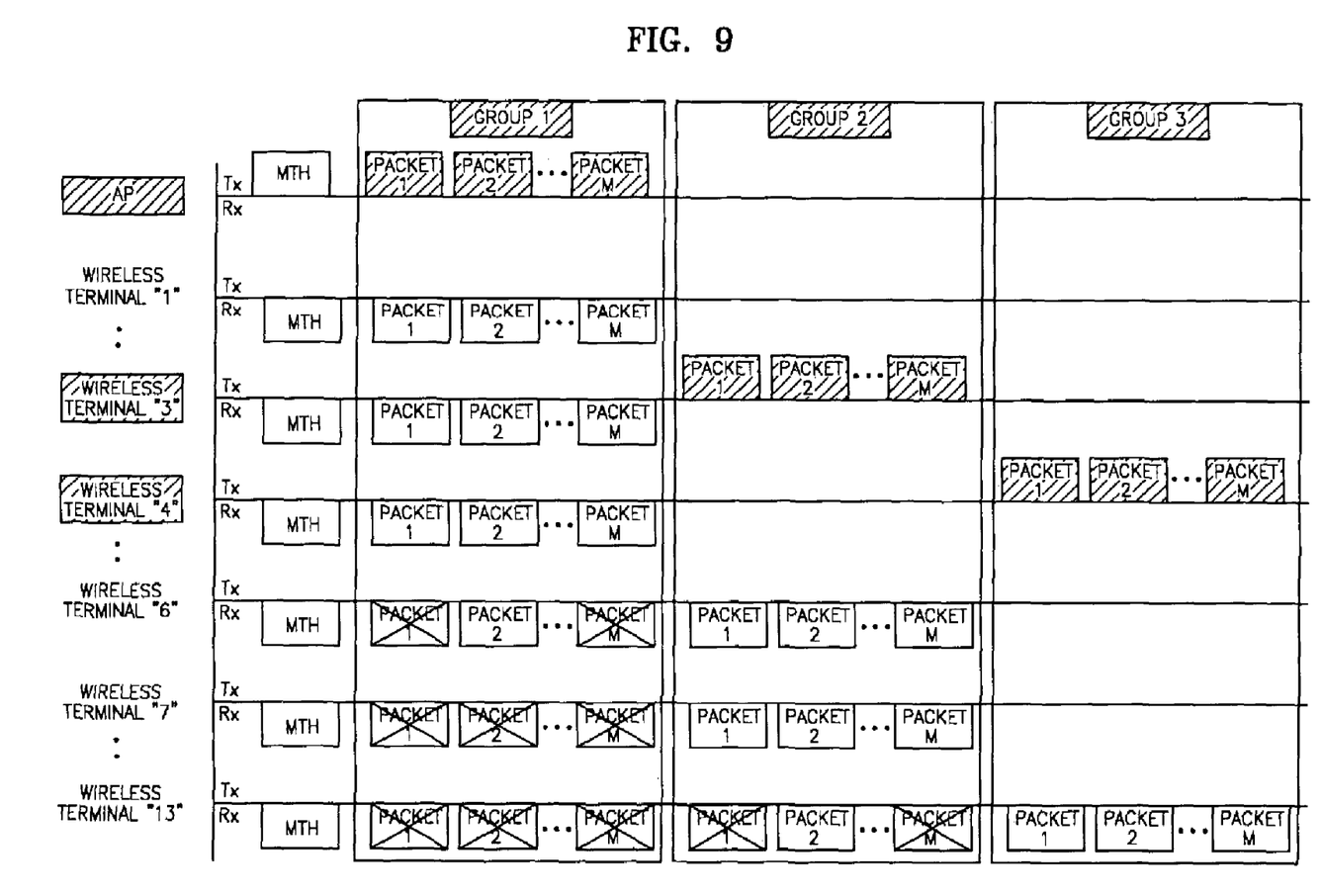
FIG. 9 is a diagram for describing retransmission of the multicast packet from the AP and the wireless terminals according to an embodiment of the present invention.

FIG. 9 is a diagram for describing retransmission of the multicast packet from the AP and the wireless terminals.

Before retransmitting the multicast packet, the AP transmits the multicast packet train header (MTU) to all of the wireless terminals. Then, the AP selected as the repeater of the group 1 retransmits the received multicast packet to all wireless terminals. At this moment, wireless terminal "1" to wireless terminal "5" included in group 1 can receive the retransmitted multicast packets without packet loss, but the wireless terminals included in other groups may have packet loss.

Consequently, wireless terminal "3" selected as the repeater of group 2 multicasts the received multicast packet. At that moment, since the wireless terminals included in group 1 have already received the multicast packets retransmitted from the repeater of group 1, they discard the multicast packets retransmitted from wireless terminal "3", i.e., the repeater of group 2. Since wireless terminals "6" through "10" may have not accurately received the multicast packet due to a packet error, they receive the multicast packets retransmitted from wireless terminal "3", i.e., the repeater of group 2.

In this case, since wireless terminals "11" through "13" included in group 3 may have not accurately received the multicast packet due to the packet error, wireless terminal "4" selected as the repeater of group 3 retransmits the multicast packet to all of the wireless terminals. In this way, the repeaters of all groups retransmit the multicast packet, which allows the whole wireless terminals to successfully receive the multicast packet.

Figure 10:
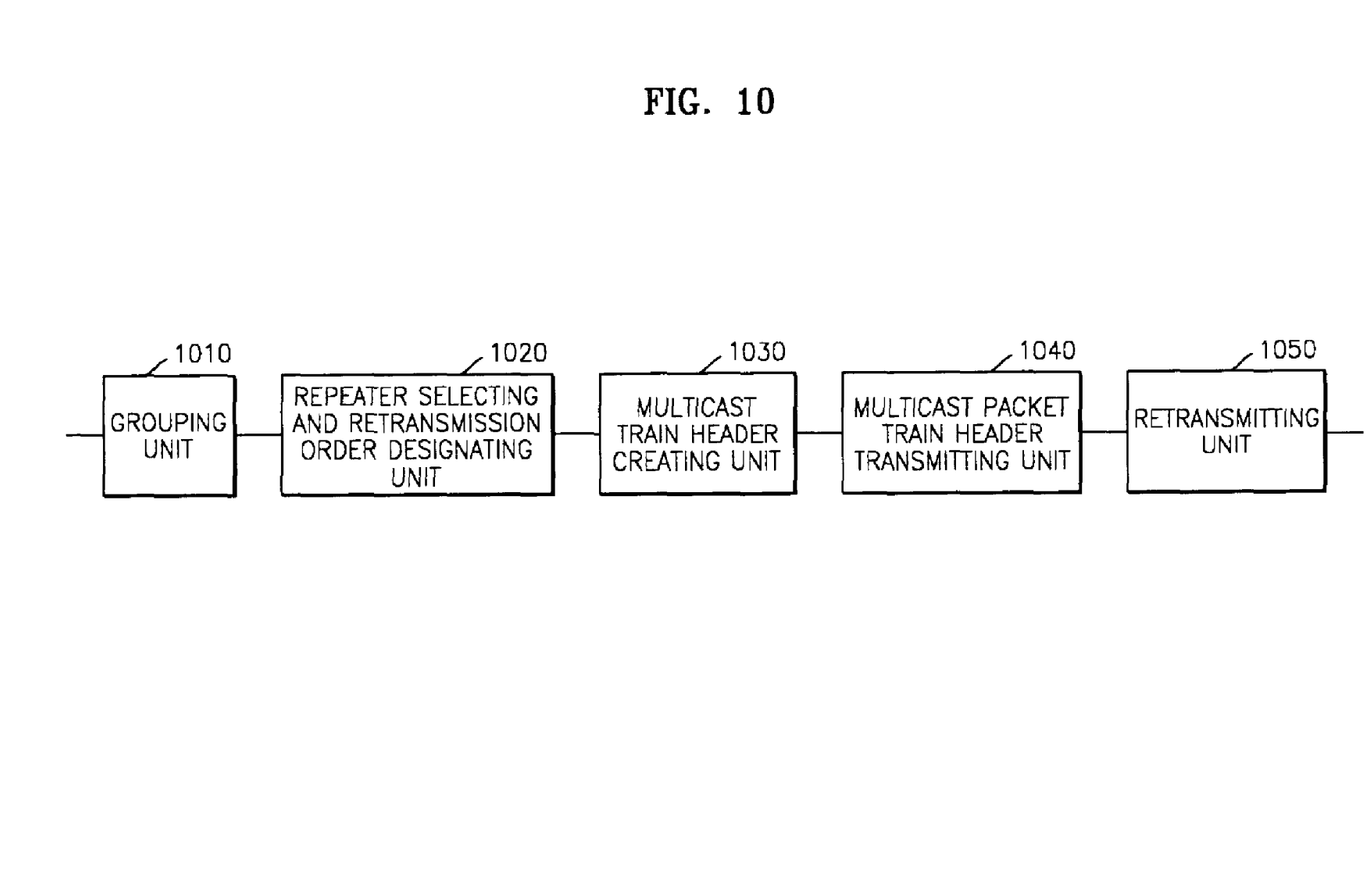
FIG. 10 is a block diagram of an apparatus for multicast data retransmission according to an embodiment of the present invention.

FIG. 10 is a block diagram of an apparatus for multicast data retransmission according to the present invention.

The apparatus for multicast data retransmission is included in the AP and includes a grouping unit 1010, a repeater selecting and retransmission order arranging unit 1020, a multicast packet train header creating unit 1030, a multicast packet train header transmitting unit 1040, and a retransmitting unit 1050.

The grouping unit 1010 groups the wireless terminals based on the distances between the wireless terminals and the AP and the amplitudes of signals output from the wireless terminals. Such grouping has been described with reference to FIG. 3. In other words, a wireless terminal in a network is grouped with nearby wireless terminals. If the amplitudes of signals output from a group of wireless terminals are smaller than those of signals output from other groups of wireless terminals because the group includes a wireless terminal with an inferior channel, the wireless terminal having the inferior channel is grouped with one of other groups of wireless terminals.

The repeater selecting and retransmission order arranging unit 1020 selects the repeater, which is to retransmit the multicast packet, from each group and arranges the order in which repeaters retransmit the multicast packet. A wireless terminal with the best channel is selected as the repeater. Since the AP can determine a status of a channel of a wireless terminal based on the amplitude of signal output from the wireless terminal, the AP selects the wireless terminal, which outputs a signal with the greatest amplitude, as the repeater. The order in which repeaters retransmit the multicast packet can be arranged at random.

The multicast packet train header creating unit 1030 creates a multicast packet train header (MTU) before the multicast packet is transmitted.

The multicast packet train header transmitting unit 1040 transmits the created multicast packet train header (MTU) to all wireless terminals.

After that, the retransmitting unit 1050 retransmits the multicast packet in the order arranged by the repeater selecting and retransmission order arranging unit 1020.

The embodiments of the invention may be provided as a program that can be embedded in a computer or in a computer readable medium to be used in general purpose digital computers.

The computer readable medium includes, but not limited to, magnetic storage media (e.g., ROM's, floppy disks, hard disks, etc.), and optically readable media (e.g.,CD-ROMs, DVDs, etc.).

According to the present invention, a repeater of each group retransmits a multicast packet when multicast data is transmitted through a wireless channel, so that reliable multicast data transmission can be achieved. A multicast data retransmission method according to the present invention effectively uses a channel as compared with automation repeat request (ARQ) using acknowledgement (ACK) or negative acknowledgement (NACK) frames and can be used in a wireless network irrespective of the number of wireless terminals. In addition, the multicast data retransmission method can provide more reliable multicast data transmission than when using a protocol that is retransmitted by an access point (AP) N times.

Moreover, since the AP groups the wireless terminals based on the distances between the wireless terminals and the AP and the amplitudes of signals output from the wireless terminals, a status of the channel can be reflected into multicast data retransmission.

While the present invention has been particularly shown and described with reference to exemplary embodiments thereof, it will be understood by those of ordinary skill in the art that various changes in form and details may be therein without departing from the spirit and scope of the invention as defined by the appended claims and their equivalents.

What is claimed is:

1. A multicast data retransmission method, the method comprising:
grouping wireless terminals based on distances between an access point and the wireless terminals and amplitudes of signals output from the wireless terminals;
selecting from each group of wireless terminals a repeater wireless terminal to retransmit multicast packets to each wireless terminal in its group, and arranging the order in which the repeaters retransmit multicast packets to their groups;
creating a multicast packet train header indicating characteristics of each of the multicast packets;
multicasting each of the multicast packets including the created multicast packet train header to all the wireless terminals; and
retransmitting by the repeater terminal in each group according to the arranged order the multicast packets to each of the terminals in the group, irrespective of whether the wireless terminals in the group receive the multicast packets.

2. The multicast data retransmission method of claim 1, wherein selecting the repeater further comprises selecting a wireless terminal from the group which outputs a signal with the greatest amplitude as the repeater by determining a status of a channel of the wireless terminal based on the amplitude of signal output from the wireless terminal.

3. A multicast data retransmission method, the method comprising:
grouping wireless terminals based on distances between an access point and the wireless terminals and amplitudes of signals output from the wireless terminals;
selecting from each group of wireless terminals a repeater wireless terminal to retransmit multicast packets to each wireless terminal in its group, and arranging the order in which the repeaters retransmit multicast packets to their groups;
creating a multicast packet train header indicating characteristics of each of the multicast packets;
multicasting each of the multicast packets including the created multicast packet train header to all the wireless terminals; and
retransmitting by the repeater terminal in each group according to the arranged order the multicast packets to each of the terminals in the group, irrespective of whether the wireless terminals in the group receive the multicast packets wherein the multicast packet train header comprises:
multicast train ID information which is used to identify a multicast packet train;
information about the number of groups of wireless terminals, the wireless terminals being connected to a wireless network and receiving the multicast packets;
information about the number of multicast packets in each group, the multicast packet being transmitted after the multicast packet train header is multicasted; and
forward error correction information which is used to correct an error of the multicast packet train header.

4. A multicast data retransmission method used in a system that retransmits multicast packets to a plurality of wireless terminals serviced by an access point, the multicast data retransmission method for a wireless terminal of the plurality of wireless terminals comprising:
receiving from the access point information including an indication of a group which the wireless terminal belongs to;
determining from the information whether the wireless terminal is selected as a repeater that is to retransmit the multicast packets; and
receiving information from the access point about the order in which repeaters retransmit the multicast packets, receiving a retransmission command from the access point, and retransmitting the multicast packets to other wireless terminals when it is determined the wireless terminal is selected as a repeater terminal.

5. The multicast data retransmission method of claim 4, further comprising receiving the retransmitted multicast packets and discarding the retransmitted multicast packets if the multicast packets have already been received without a packet error when it is determined the wireless terminal is not selected as a repeater terminal.

6. A multicast data retransmission method, the method comprising:
grouping wireless terminals based on distances between an access point and the wireless terminals and amplitudes of signals output from the wireless terminals; and
selecting a repeater from each group to retransmit multicast packets to its group, wherein selecting a repeater includes selecting a wireless terminal in a group that outputs a signal with the greatest amplitude as the repeater for the group by determining a status of a channel of the wireless terminal based on the amplitude of signal output from the wireless terminal and determining the order in which the repeaters retransmit the multicast packets; and
transmitting a retransmission command to the repeaters in the order in which the repeaters retransmit the multicast packets.

7. An apparatus for multicast data retransmission, the apparatus comprising:
a grouping unit which groups wireless terminals based on distances between the wireless terminals and amplitudes of signals output from the wireless terminals;
a repeater selecting and retransmission order arranging unit which selects a repeater from each group to retransmit the multicast packets to at least the wireless terminal in each group and arranges the order in which repeaters retransmit the multicast packets;
a multicast packet train header creating unit which creates a multicast packet train header before the multicast packets are multicasted;
a multicast packet train header transmitting unit which transmits the created multicast packet train header to all wireless terminals; and
a retransmitting unit which retransmits the multicast packets according to the order arranged by the repeater selecting and retransmission order arranging unit, after the multicast packet train header transmitting unit multicasts the multicast packet train header.

8. The apparatus of claim 7, wherein the retransmitting unit transmits the retransmission command to a repeater, which is first to retransmit the multicast packet, and transmits the retransmission command to a repeater which is second to retransmit the multicast packet.

9. A computer readable recording medium readable by a machine, and being encoded with a computer program for executing the multicast data retransmission method of claim 1.

10. A computer readable recording medium readable by a machine, and being encoded with a computer program for executing the multicast data retransmission method of claim 4.

11. A computer readable recording medium readable by a machine, and being encoded with a computer program for executing the multicast data retransmission method of claim 6.

12. The method of claim 1 wherein receivers receiving the multicast packets without error discard the received retransmitted multicast packets.

13. The method of claim 1 wherein the access point is selected as the repeater for one group.

14. The method of claim 4 wherein the order in which repeaters retransmit the received multicast packet is arranged to prevent collisions of multicast packets during each repeater retransmission of the received multicast packet.

15. The method of claim 6 wherein the access point is selected as the repeater for one group.

16. The method of claim 6 wherein the order in which repeaters retransmit the received multicast packet is arranged to prevent collisions of multicast packets during each repeater retransmission of the received multicast packet.

* * * * *